MECHANICAL SETTING AND/OR READING DEVICE FOR CODE UNIT ON TELEPRINTERS AND SIMILAR DATA PROCESSING EQUIPMENTS

Filed April 25, 1967

INVENTORS
GIUSEPPE RICCIARDI
BRUNO SANDRONE
BY John Toggenburger
AGENT

Sept. 2, 1969 G. RICCIARDI ET AL 3,465,100

MECHANICAL SETTING AND/OR READING DEVICE FOR CODE UNIT ON TELEPRINTERS AND SIMILAR DATA PROCESSING EQUIPMENTS

Filed April 25, 1967 2 Sheets-Sheet 2

INVENTORS
GIUSEPPE RICCIARDI
BRUNO SANDRONE
BY John Toggenburger
AGENT

United States Patent Office 3,465,100
Patented Sept. 2, 1969

3,465,100

MECHANICAL SETTING AND/OR READING DEVICE FOR CODE UNIT ON TELEPRINTERS AND SIMILAR DATA PROCESSING EQUIPMENTS

Giuseppe Ricciardi and Bruno Sandrone, Ivrea, Turin, Italy, assignors to Ing. C. Olivetti & C., S.p.A., Ivrea, Italy, a corporation of Italy Filed Apr. 25, 1967, Ser. No. 638,180
Claims priority, application Italy, May 10, 1966, 10,951/66
Int. Cl. H04l 15/24, 15/34, 17/16
U.S. Cl. 178—33 15 Claims

ABSTRACT OF THE DISCLOSURE

A mechanical setting and/or reading device for code units on teleprinters, comprises a plurality of settable code elements circumferentially arranged around a predetermined axis and each one provided with a wedge shaped portion. A setting and/or reading member is provided with a pair of opposite tapered surfaces and is rotatable around said axis to sequentially cooperate with said portions. The code elements are settable through a radial movement in an embodiment for a series-to-parallel converter of a telegraphic receiver, and are settable through an axial movement in an embodiment for a parallel-to-series converter. The device is also embodied in storing device for a plurality of code combinations and comprises for each code unit a plurality of axially settable elements adapted to be set by a first rotatable member and to be read by a second rotatable member.

This invention relates to a mechanical setting and/or reading device for code units on teleprinters and similar data processing equipments comprising a plurality of elements each one associated with one of said units and adapted to selectively assume one of two different positions according to the condition of the associated code unit, and a setting and/or reading member adapted to sequentially assume one of two different locations and to cooperate with said elements.

There are already known several devices of the above type. In a known device, the relative displacement of the code elements with respect to the setting or reading member is effected intermittently, whereby the device is operated at relatively slow speed.

In another known device the elements are formed of balls which are set up by a pair of electromagnets. This device requires that the electromagnets be energized in time coincidence with the passage of the balls between the electromagnets. Furthermore the armature of each electromagnet directly impacts on the balls.

These disadvantages are obviated by the device according to the invention, which is characterized in that each of said elements comprises a pair of opposite tapered surfaces adapted to selectively cooperate with a further pair of tapered surfaces provided on said member, moving means being provided for relatively displacing said member and said elements to cause said member to sequentially set up said elements according to the locations assumed thereby, or to cause said elements to be sequentially read by said member.

This and other characteristics of the invention will become apparent from the following description of some preferred embodiments thereof and from the accompanying drawings, wherein.

Figure 1:
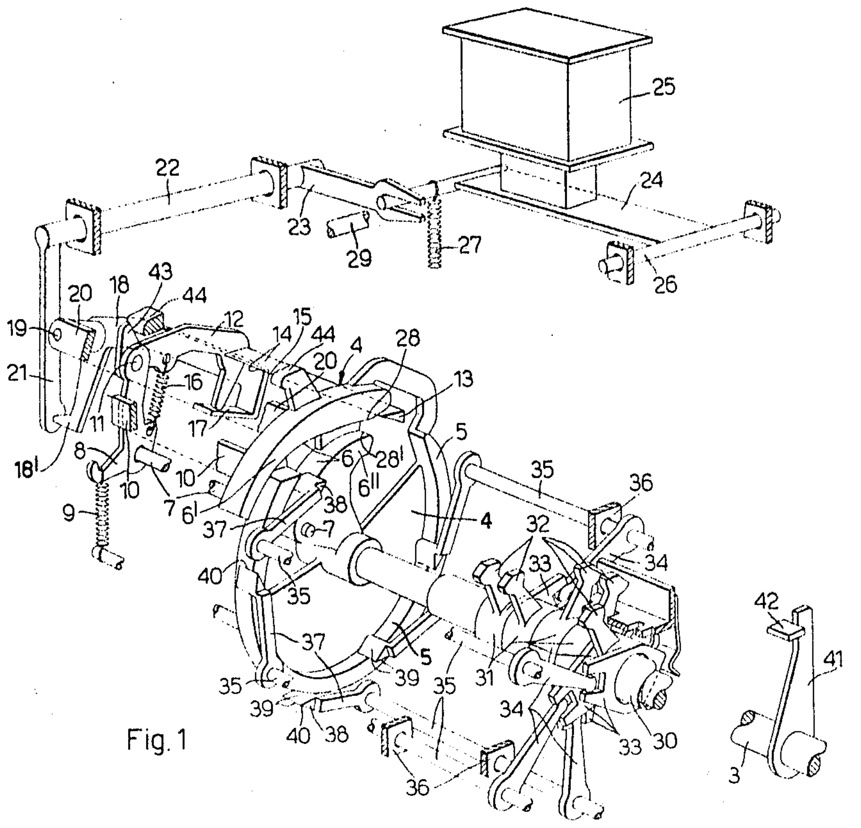
FIGURE 1 is a partial perspective view of a receiving device of a teleprinter, incorporating a mechanical setting device according to a first embodiment of the invention.

With reference to the FIG. 1, a first embodiment of the invention is incorporated in a receiving device of a teleprinter of the start-stop type and comprises a receiver main shaft 3 adapted to be cyclically rotated counterclockwise in a known manner upon receiving each code combination. The receiving device is provided with a series-to-parallel converter comprising a disk 4 secured to an end of the shaft 3 and provided at its periphery with a ring portion 5 extended about 270 degrees. Furthermore, the disk 4 is provided with a guide 6 formed of two converging rims 6′ and 6″ and arranged angularly adjacent to the ring 5.

Secured to the disk 4 is a pin 7 pivotally mounting a lever 8 normally urged by a spring 9 to contact a projection 10 of the disk 4. Furthermore, the lever 8 is provided with a pivot 11 pivotally mounting a setting member formed of an arm 12 provided with a wedge portion 13 defined by two tapered surfaces 14 which join along a sharp edge 15. A spring 16 normally urges the arm 12 to contact a lug 17 of a lever 18 fulcrumed on a pivot 19 secured to a second projection 20 of the disk 4. The lever 18 is provided with a projection 18′ substantially located on the axis of the shaft 3 and normally urged by the spring 16 to contact an arm 21 secured to a shaft 22 rotatably mounted on the machine frame.

Secured to the shaft 22 is a second arm 23 pin and slot connected with an armature 24 of a receiving electromagnet 25 known per se. The armature 24 is secured to a pivot 26 rotatably mounted on the machine frame. The electromagnet 25 is normally energized and holds the armature 24 raised in the position of FIG. 1 against the urging of a spring 27 connected thereto and of the spring 16. Therefore the wedge portion 13 is normally held in an outermost location, with its sharp edge 15 near an edge 28 of the outer rim 6′ of the guide 6.

On the contrary, when the electromagnet 25 is deenergized the armature 24 is rocked counterclockwise by the springs 16 and 27 till the arm 23 contacts a stationary pin 29, while the wedge portion 13 is brought with its sharp edge 15 near the edge 28′ of the inner rim 6″ of the guide 6.

The shaft 3 is rotatably mounted within a sleeve 30 secured to the machine frame. The series-parallel converter comprises a plurality of five members each one comprising a hub 31 rotatably mounted on the sleeve 30 and a transfer arm 32. The arms 32 are adapted to be rocked between a pair of common angular positions on the shaft 3, and are adapted to be sensed by means not shown in the drawings for simultaneously transferring a code combination to a plurality of code bars in a manner known per se. Secured to each hub 31 is also a fork arm 33, the various arms 33 being mutually angularly offset. Each fork arm 33 engages a corresponding lever 34 secured to a shaft 35. The various shafts 5 are circumferentially fulcrumed on a stationary support 6 coaxial with the shaft 3 and angularly spaced according to the code impulses.

Secured to each shaft 35 is an element associated with a code unit and formed of a lever 37 integral with a wedge portion 38 defined by a pair of tapered surfaces 39 which join along a sharp edge 40. Each wedge portion 38 is normally locked in one of two different positions by either the inner surface or the outer surface of the ring 5. Furthermore, secured to the shaft 3 is an arm 41 normally driven by a friction joint not shown in the drawings to contact a lug 42 of a trip lever of the receiver shaft.

Upon receiving the start signal of each code combination, the electromagnet 25 is deenergized and causes the lug 42 to release the arm 41 in a manner known per se, whereby the receiver shaft 3 is rotated counterclockwise one revolution together with the disk 4 and the levers 8 and 18, the arm 12 and the wedge portion 13. The rims 6' and 6'' sequentially convey the encountered wedge portions 38 to a central position, while the electromagnet 25 sequentially receives the five signals of a code combination.

The wedge portion 13 is located in an outer location responsive to the mark impulses and in an inner location responsive to a space impulse. Therefore, when the wedge portion 13 is located in the outer location its inner tapered surface 14 engages the outer tapered surface 39 of the encountered wedge portion 38, which is thus displaced inwards. On the contrary, when the wedge portion 13 is located in the inner location, its outer tapered surface 14 engages the inner tapered surface 39 of the wedge portion 38, which is thus displaced outwards. In any case the wedge portions 38 so set up are then locked in the reached position by the ring 5.

The levers 37 through the shafts 35 and the levers 34, correspondingly set up the hubs 31 and the transfer arms 32, which thus represent the code combination sequentially received by the electromagnet 25, and may be then sensed in a known manner. After the five code signals, the electromagnet 25 receives a stop signal which is a mark impulse. The electromagnet is thus energized and the armature 24 is attracted.

In order to prevent that incidentally the wedge portion 13 could impinge on one of the wedge portions 38, the arm 12 is provided with a shoulder 43 adapted to cooperate with a stop member or projection 44 integral with the disk 4. As soon as the sharp edge 15 of the wedge portion 13 is arrested by the sharp edge 40 of one of the wedge portions 38, the lever 8 is rocked clockwise thus tensioning the spring 9. Now if the sharp edge 40 has not yet disengaged the sharp edge 15, the shoulder 43 of the arm 12 encounters the projection 44 and the arm 12 is positively rocked counterclockwise overcoming the tension of the spring 16. Then the wedge portion 13 is displaced outwards thus disengaging the wedge portion 38 whereon it impinged, and thus preventing any damage of the device.

Figure 2:
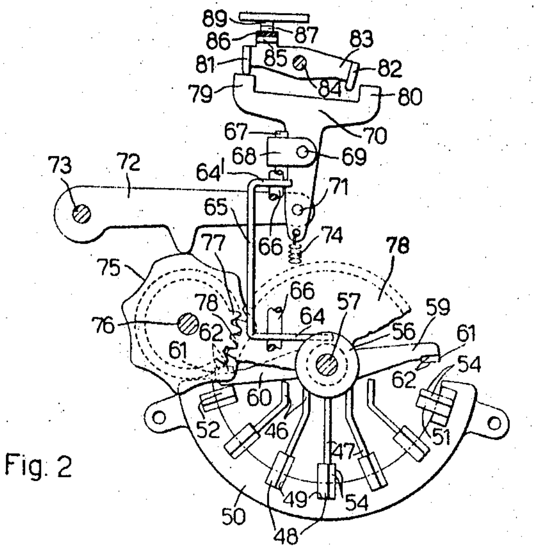
FIGURE 2 is a left hand partial longitudinal sectional view of a transmitting device of a teleprinter incorporating a mechanical reading device according to another embodiment of the invention.
Figure 3:
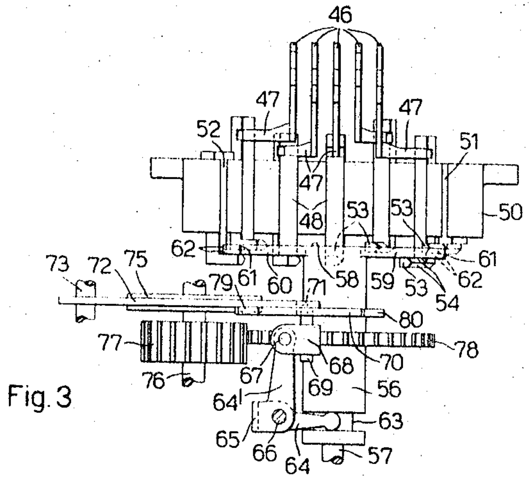
FIGURE 3 is a partial view of the device of FIGURE 2.

With reference to the FIGS. 2 and 3, the numeral 46 indicates each one of the conventional transmitting code bars of a teleprinter. Each code bar 46 is slidable on the machine frame to assume one of two positions, for example under the action of a keyboard. Each code bar 46 is provided with a lug 47 engaging a notch of an element or slide 48 of a parallel-to-series converter. Each slide 48 is axially slidable in a suitable notch 49 of a stationary support 50, the various notches 49 being circumferentially arranged substantially within 180 degrees. Two other slides 51 and 52 (FIG. 4) are secured to the support 50 and represent the start and stop impulses. Each slide 48, 51 and 52 is provided at one end with a wedge portion 53 defined by two tapered surfaces 54. Furthermore, the wedge portion 53 is provided at its rear side with two bevels 54'.

Slidably and rotatably mounted on a stationary shaft 57 is a sleeve 56 (FIG. 2) secured to a reading member or lever 58 having two opposite arms 59 and 60. A wedge portion 61 provided on each arm 59, 60 is defined by a pair of tapered surfaces 62. At rest the arm 59, or 60, (in FIG. 2 the arm 59) is located with its wedge portion 61 in front of the wedge portion 53 of the start slide 51. Secured to the other end of the sleeve 56 is a groove 63 (FIG. 3) engaged by an arm 64 of a bail 65 fulcrumed on a stationary pivot 66. Secured to another arm 64' of the bail 65 is a pin 67 rotatably and slidably mounting a block 68. Secured to the block 68 is another pin 69, which is also perpendicular to the pin 67.

A lever 70 (FIG. 2) fulcrumed on the pin 69 is linked at 71 with a lever 72 fulcrumed on a stationary pivot 73. A spring 74 normally urges the lever 72 to contact a cam 75 provided with seven lobes corresponding to the signals to be transmitted for each code combination. The cam 75 is secured to a shaft 76 cyclically rotatable counterclockwise and representing the conventional transmission main shaft of the teleprinter. Secured to the shaft 76 is also a gear 77 meshing with another gear 78 having a diameter twice that of the gear 77 and secured to the sleeve 56.

The lever 70 is provided with two shoulders 79 and 80 adapted to selectively engage two corresponding lugs 81 and 82 of a swing lever 83 frictionally rotatable on a stationary pivot 84. Secured to a lug 85 of the swing lever 83 is a plate 86 of insulating material carrying a movable transmission contact 87 connected to the telegraphic line and normally making with a corresponding stationary contact 89 connected to a power source.

Figure 4:
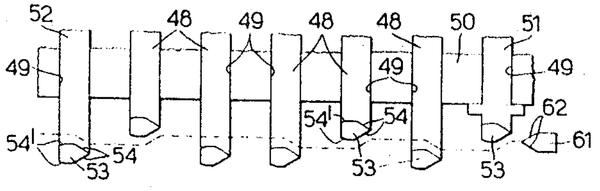
FIGURE 4 is a diagrammatic view of a detail of the device of FIGURE 3.

Upon setting up the code bars 46 according to a code combination, for example as shown in FIG. 4, the lugs 47 position accordingly the slides 48, which are then locked in the reached position, while a cycle of the shaft 76 (FIG. 2) is started in a known manner. Then the sleeve 56 is rotated 180 degrees clockwise bodily with the lever 58.

Now, the wedge portion 61 of the arm 59 reads first the wedge portion 53 of the start slide 51, then the five wedge portions 53 of the code slides 48, and finally the wedge portion 53 of the stop slide 52. According to the position of the different slides 48, 51 and 52, the wedge portion 61 is axially displaced bodily with the lever 58 and the sleeve 56. The bevels 54' of each wedge portion 53 contribute to disengage early the wedge portion 61 from the already read portion 53.

In FIG. 4 the displacement of the wedge portion 61 in reading the slides 48, 51 and 52 is shown by a dot-and-dash line. The sleeve 56 (FIG. 3) through the bail 65 and the block 68 predisposes the lever 70 (FIG. 2) so as to bring either the left hand shoulder 79 as shown in FIG. 2, or the right hand shoulder 80 under the corresponding lug 81, 82.

During the rotation of the lever 58 through 180 degrees, the cam 75 rotates 360 degrees. Then each lobe of the cam 75 sequentially rocks the lever 72 counterclockwise, thus raising the lever 70 in synchronism with the passage of the wedge portion 61 on each slide 48, 51 and 52, whereby the lever 70 makes or breaks the contacts 87, 89 according to the code combination to be transmitted. In the next following cycle of the transmission shaft 76 the reading operation will be effected by the arm 60, instead of the arm 59.

Figure 5:
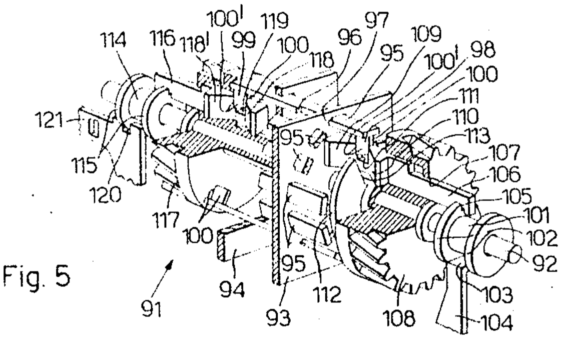
FIGURE 5 is a partial perspective view of a storing device for a teleprinter, incorporating a mechanical setting and reading device according to a further embodiment of the invention.

With reference to FIG. 5, the numeral 91 generically indicates a cell of a storing device for a multilevel code of a teleprinter. To store a series of code combinations, for example of the five level type, the storing device requires a group of five cells 91. Each cell 91 comprises a plurality of twelve elements or slides 95 circumferentially arranged on a pair of stationary plates 93 and 94 around a stationary shaft 92. Each slide 95 may assume two axial positions determined by two shoulders 96 and 97 adapted to cooperate with the plate 93. Each slide 95 is provided with a pair of wedge portions 98, and 99 respectively, each one defined by a pair of tapered surfaces 100. A further pair of tapered surfaces 100' opposite to the surfaces 100 makes the section of each wedge portion 98 and 99 in form of a rhomb.

Rotatably and slidably mounted at an end of the shaft 92 is a sleeve 101 provided with two flanges 102 engaging a lug 103 of a corresponding code bar or slide 104 adapted to be displaced parallelly to the shaft 92, for example through the keyboard, in a manner known per se. A notch 105 provided on one of the flanges 102 is engaged by an end of a setting member or slide 106 slidably mounted in a slot 107 of a helicoidal gear 108 rotatable on the shaft 92. The other end of the slide 106 is provided with two opposite tapered surfaces 109 and 110 converging toward and mutually separated by a notch 111. The surfaces 109 and 110 are adapted to cooperate with the wedge portions 98 of the slides 95. Secured to the gear 108 is a disk 112 adapted to lock the wedge portions 98 of each slide 95 in the reached position and is provided with an opening 113 to allow the slides 95 and 106 to slide axially.

Rotatably and slidably mounted on the other end of the shaft 92 is another sleeve 114 provided with two flanges 115, one of which is engaged by a reading member or slide 116 slidable in a notch of another helicoidal gear 117. The slide 116 is provided with two tapered surfaces 118, 118' and with a notch 119 similar and symmetrically arranged with respect to those of the slide 106. The tapered surfaces 118, 118' are adapted to cooperate with the wedge portion 99 of each slide 95. The other flange 115 engages a groove 120 of a corresponding transmission code bar 121, which may be connected for example to the bar 46 of the device of FIG. 2.

Upon setting up the code bars 104, for example by means of the keyboard, through the lugs 193 and the sleeves 101, the various slides 106 are accordingly axially positioned. Simultaneously the gear 108 is rotated one step counterclockwise together with the slide 106, in a known manner, whereby the surfaces 109, 110 selectively engage the wedge portion 98 of the encountered slide 95 which is thus set up according to the code unit represented by the bar 104. Then the wedge portion 98 passes through the notch 111 of the slide 106 and is locked in the reached position by the disk 112. Obviously if one of the slides 95 is already in the position corresponding to the present location of the slide 106 the wedge portion 98 directly passes through the notch 111 without any displacement. The pair of tapered surfaces 100' of the wedge portions 98 contribute to early disengage the slide 106 from the portions 98.

Upon rotating the wheel 117 bodily with the slide 116 one step counterclockwise, the surfaces 118 and 118' are engaged by the wedge portion 99 of the encountered slide 95. Then the slide 116 is selectively displaced axially bodily with the sleeve 114 and the transmission bar 121 according to the code unit read from the slide 95. Obviously, if the slide 116 is already located in the position corresponding to the one of the slide 95, the wedge portion 99 passes through the notch 119 without contacting the tapered surfaces 118 and 118' and without effecting the slide 116.

It is to be noted that the two wheels 108 and 117 are individually rotated, whereby the slides 95 may be read with a delay upon being set up. In this case the two slides 106 and 116 will assume two different angular positions and cooperate with two different slides 95.

What is claimed is:

1. A mechanical setting device for binary code units on teleprinters and similar data processing equipments, having a plurality of elements each one associated with one of said code units and adapted to selectively assume one of two different positions according to the condition of the associated code unit, a stationary support for mounting said elements in a circumferential relationship with respect to a predetermined axis, and a setting member drivable to sequentially assume one of two different locations, said member being rotatable around said axis to sequentially cooperate with said elements, wherein the improvement comprises:
   (a) a pair of opposite tapered surfaces provided on each one of said elements,
   (b) a further pair of opposite tapered surfaces provided on said member and adapted to selectively engage the tapered surfaces of said elements,
   (c) and moving means for cyclically rotating said member with respect to said elements to cause said member to sequentially set up said elements upon engagement of said tapered surfaces according to the locations assumed thereby.

2. A device according to claim 1, comprising in combination:
   (d) a wedge portion formed by said pair of tapered surfaces on each one of said elements, the sharp edge of said wedge portion facing said member in said rotation.

3. A mechanical series-to-parallel converting device of the units of a code combination on teleprinters and similar data processing equipments, having a receiving electromagnet for sequentially receiving said units, a plurality of elements each one associated with one of said code units and adapted to selectively assume one of two different positions according to the condition of the associated code unit, and a setting member drivable by said electromagnet to sequentially assume one of two different locations and to cooperate with said elements, wherein the improvement comprises:
   (a) a rotatable shaft,
   (b) a stationary support,
   (c) a wedge portion having a sharp edge on each one of said elements,
   (d) a set of pivot means mounting said elements and arranged on said stationary support circumferentially with respect to said shaft, said elements being substantially tangentially directed with respect to said shaft,
   (e) a further wedge portion having a further sharp edge on said member, said two different locations being mutually offset in radial direction with respect to said shaft,
   (f) and means for causing said member to be rotated bodily with said shaft, the sharp edge of said elements facing said further sharp edge during the rotation of said member.

4. A device according to claim 3, comprising in combination:
   (g) a disk secured to said shaft,
   (i) and a guide on said disk for bringing each one of said elements in a central position with respect to said two different positions when it approaches said member.

5. A device according to claim 4, comprising in combination:
   (j) a ring portion integral with said disk and adapted to lock each one of said elements in the reached position as long as it is not engaged by said member and said guide.

6. A device according to claim 4, comprising in combination:
   (j) a plurality of output members mounted on said shaft so as to be rocked between a pair of common angular positions,
   (k) and means for connecting each one of said elements to one of said output members.

7. A device according to claim 4, comprising in combination:
   (j) a lever bodily rotatable with said disk,
   (k) a pivot on said lever pivotally mounting said setting member,
   (l) yieldable means connecting said lever with said disk,
   (m) and a stop member integral with said disk and adapted to cooperate with said setting member for limiting the displacement of said lever with respect to said disk, and for displacing said member into a predetermined one of said two different locations when the wedge portion of one of said elements is impinging on said further wedge portion.

8. A device according to claim 7, comprising in combination:

(n) a lever pivotally mounted on said disk as to be moved in a plane perpendicular to said disk, said lever comprising a first projection for driving said member and a second projection operable by said electromagnet, said second projection being located on the axis of said shaft.

9. A mechanical reading device for binary code units on teleprinters and similar data processing equipments, having a plurality of elements each one associated with one of said code units and adapted to selectively assume one of two different positions according to the condition of the associated code unit, a stationary support for mounting said elements in a circumferential relationship with respect to a predetermined axis, and a reading member rotatable around said axis to sequentially read said elements and to assume accordingly one of two different locations, wherein the improvement comprises:

(a) a pair of opposite tapered surfaces provided on each one of said elements, (b) a further pair of opposite surfaces provided on said member and adapted to be selectively engaged by the tapered surfaces of said elements, (c) and moving means for cyclically rotating said member with respect to said elements to cause said member to be sequentially located in said locations according to the positions assumed by the read elements.

10. A device according to claim 9, comprising in combination:

(d) a wedge portion formed by said pair of tapered surfaces on each one of said elements, the sharp edge of said wedge portion facing said member in said rotation.

11. A mechanical reading device of the units of a code combination to be transmitted for teleprinters and similar data processing equipments, having a plurality of elements each one associated with one of said code units, means for simultaneously positioning said elements according to the said code combination, a reading member for sequentially reading said elements to assume accordingly one of two different locations, and a transmission contact operable by said member according to the code combination so read, wherein the improvement comprises:

(a) a rotatable shaft, (b) a stationary support for mounting said elements in a circumferential relationship with respect to said shaft, said elements being slidable on said support in axial direction, (c) a wedge portion having a sharp edge on each one of said elements, (d) a further wedge portion having a sharp edge on said member, said two different locations being axially offset with respect to said shaft, (e) and means for rotating said shaft to cause said further wedge portion to sequentially engage the wedge portions of said elements, the sharp edge of said elements facing the sharp edge of said further wedge portion during the rotation of said shaft.

12. A device according to claim 11, wherein said elements are mounted on said stationary support within 180 degrees, comprising in combination:

(f) another wedge portion on said member diametrically opposite to said further wedge portion to alternately cooperate with the wedge portions of said elements upon rotating said member 180 degrees.

13. A mechanical setting and reading device for binary units of a multilevel code on teleprinters and similar data processing equipments having a plurality of elements arranged in group each one associated with a level of said code to store a plurality of code combinations, each element being adapted to selectively assume one of two different positions associated with the two conditions of each code unit, a setting member, and a reading member, said members being adapted to cooperate with said elements and to sequentially assume one of two different locations, wherein the improvement comprises:

(a) two pairs of opposite tapered surfaces provided on each one of said elements, (b) a further pair of opposite surfaces provided on each one of said members and adapted to selectively engage a corresponding pair of tapered surfaces of each one of said elements, (c) and moving means for individually relatively displacing said members with respect to said elements to cause said setting member to sequentially set up said elements according to the locations assumed thereby and said reading member to be sequentially located according to the positions assumed by the read elements.

14. A device according to claim 13, comprising in combination:

(d) a shaft, (e) a stationary support for mounting each plurality of said elements circumferentially with respect to said shaft, said elements being axially slidable on said support, (f) two wedge portions formed by said two pairs of tapered surfaces on each one of said elements, the sharp edge of said wedge portions facing the corresponding member in said relative displacement, (g) and means for individually rotating each one of said members on said shaft.

15. A device according to claim 14, wherein the tapered surfaces of each one of said further pairs are distanced and converging, comprising in combination:

(h) a notch provided between said tapered surfaces to allow the corresponding wedge portion of said elements to pass between said tapered surfaces.

References Cited

UNITED STATES PATENTS

| | | | |
|---|---|---|---|
| 1,639,213 | 8/1927 | Creed | 178—34 |
| 2,612,555 | 9/1952 | Kinsman et al. | 178—33 |

THOMAS A. ROBINSON, Primary Examiner

U.S. Cl. X.R.

178—27, 17.5